(12) United States Patent
Gu et al.

(10) Patent No.: US 7,328,026 B2
(45) Date of Patent: Feb. 5, 2008

(54) SIGNALING IN A WIRELESS NETWORK WITH SEQUENTIAL COORDINATED CHANNEL ACCESS

(75) Inventors: Daqing Gu, Burlington, MA (US); Zhifeng Tao, Brooklyn, NY (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 622 days.

(21) Appl. No.: 10/915,801

(22) Filed: Aug. 11, 2004

(65) Prior Publication Data

US 2006/0034219 A1 Feb. 16, 2006

(51) Int. Cl.
*H04Q 7/20* (2006.01)
(52) U.S. Cl. .................................. 455/452.1; 370/329
(58) Field of Classification Search ................ 370/329; 455/452.1
See application file for complete search history.

(56) References Cited

U.S. PATENT DOCUMENTS

2006/0009229 A1\* 1/2006 Yuan et al. ............... 455/452.1
2006/0034219 A1\* 2/2006 Gu et al. .................... 370/329

\* cited by examiner

*Primary Examiner*—William D. Cumming
(74) *Attorney, Agent, or Firm*—Dirk Brinkman; Clifton D. Mueller; Gene V. Vinokur

(57) ABSTRACT

A method signals data in a channel of a network including multiple stations and an access point connected by a wireless channel. A station first requests access to the channel using a sequential coordinated channel access method of an access point. After the station receives permission to access the channel during a contention free period at a time corresponding to a sequence index value received by the station from the access point, the station transmits a resource request message to the access point to obtain a bandwidth allocation. In response, the station receives the bandwidth allocation, and the station can then transmit data during the contention free period according to the bandwidth allocation.

14 Claims, 9 Drawing Sheets

100

200

400

500

600

700

| Traffic Type | TSID | Direction | Access Policy | Aggregation | APSD | User Priority | TS Info ACK Policy | Schedule | Reserved |
|---|---|---|---|---|---|---|---|---|---|
| 901 | 902 | 903 | 904 | 905 | 906 | 907 | 908 | 909 | 910 |

SIGNALING IN A WIRELESS NETWORK WITH SEQUENTIAL COORDINATED CHANNEL ACCESS

FIELD OF THE INVENTION

This invention relates generally to wireless networks, and more particularly to access control and signaling in wireless local area networks.

BACKGROUND OF THE INVENTION

In a wireless local area network (WLAN) according to the IEEE 802.11 standard, an access point (AP) in a cell coordinates packet transmission for all stations associated with the cell. A single wireless channel, i.e., frequency band, is shared by both the uplink from the station to the AP, and the downlink from the AP to the station for all data and control signals. Every station can communicate with the AP, whereas it is not required for any two stations to be within communication range of each other.

The transmission rate of the wireless channel can vary, depending on a perceived signal-to-noise ratio (SNR). For example, the physical layer of the IEEE 802.11b standard supports four rates at 1 Mbps, 2 Mbps, 5.5 Mbps and 11 Mbps.

IEEE 802.11e HCCA

To support a given quality of service (QoS), the IEEE 802.11e standard defines two operating modes: enhanced distributed channel access (EDCA), and hybrid coordinated channel access (HCCA). The EDCA mode is based upon carrier sensing multiple access with collision avoidance (CSMA/CA). CSMA/CA provides prioritized channel access for up to four access categories (ACs). Each AC is associated with a set of QoS parameters for channel contention, such as backoff values, to realize different services among the ACs.

The HCCA mode allows a hybrid coordinator (HC) located at the AP to poll stations for contention-free access during a contention-free period (CFP), and allocates a transmission opportunity (TXOP) at any time during a contention period (CP). During the transmission opportunity, the station can send one packet. HCCA enables parameterized QoS for each data stream. The HC allocates a transmission opportunity (TXOP) in both the CFP and the CP. Each TXOP specifies a start time and a duration of a transmission for a particular station. The traffic profile and QoS requirements of each data stream can be taken into consideration when centralized scheduling is used for TXOP allocation.

To regulate uplink transmission, the HC sends CF-Poll messages to each station in order to collect current traffic information, such as data arrival rate, and data size. The standard specifies a simple round-robin scheduling algorithm to poll each station during predefined service intervals according to a QoS contract.

Dynamic TDMA Based Scheme

Dynamic time division multiple access (TDMA) offers an alternative technique for parameterized QoS. The entire channel is divided into time slots, and multiple time slots form a superframe. The time slot allocation is performed by the AP, which takes into account the QoS requirements of each data stream. After the slots are allocated, all transmissions begin at the predefined time and last for predefined maximum durations at a granularity of a time slot. Thus, the signaling procedure and resource allocation is simply based on the channel access protocol.

The slot allocation is also adjusted regularly in order to accommodate short-term rate variations of applications. The AP can use several acknowledgement (ACK) policies, e.g., immediate ACK, delayed ACK, repetition, etc., to acknowledge reception of each packet. These ACK policies accommodate diverse applications and traffic types, e.g., unicast, multicast and broadcast transmissions. Furthermore, access slots, which are typically much smaller than data slots, are used by joining stations to send the AP requests such as association, authentication, resource reservations, etc. These access slots are typically contended for using via CSMA/CA or slotted Aloha.

The MAC design in the HiperLAN/2 (H/2) and the IEEE 802.15.3 standards adopts this dynamic TDMA based scheme to coordinate QoS-oriented channel access among contending stations.

Both the polling-based method and the dynamic TDMA-based method have drawbacks with respect to providing QoS in wireless LANs. The polling-based channel access method grants applications with QoS in a relatively flexible way. That method can handle variable packet size, and can accommodate short-term rate variations. However, this flexibility is achieved at the cost of high signaling overhead. The polling procedure incurs non-negligible channel inefficiency because every uplink data packet involves a polling message exchange with HC. Moreover, the polling messages are transmitted at the base rate, e.g., 1 Mbps according to the 802.11b standard, to accommodate different transmission rates of various stations. This further deteriorates the throughput.

The dynamic TDMA-based channel access method can efficiently provide QoS support for constant-bit-rate (CBR) multimedia applications, but not for variable-bit-rate (VBR) applications. Typically, the VBR applications, such as video-conferencing, have variable packet sizes, or time-varying source rates. Moreover, the TDMA-based method requires strict, fine-grained time synchronization at a 'mini-slot' level.

Another channel access method uses a "central coordination and distributed access," Lo et al. "An Efficient Multi-polling Mechanism for IEEE 802.11 Wireless LANs," IEEE Transactions on Computers, Vol. 52, No. 6, June 2003. However, that method has several limitations. First, that method does not have a mechanism to accommodate the multi-rate physical-layer capability specified by the current IEEE 802.11 standard. Therefore, potential throughput gain is greatly compromised. Second, that method does not have a mechanism to accommodate short-term traffic variations while ensuring long-term bandwidth for each data stream according to its QoS contract. Third, that method does not have any policing mechanism to detect and penalize aggressive or misbehaving data streams that violate their QoS specifications.

To overcome the problems associated with the above channel access methods, U.S. patent application Ser. No. 10/888,398, "Sequential Coordinated Channel Access in Wireless Networks," filed on Jul. 9, 2004, by Yuan et al., provides for a sequential coordinated channel access (SCCA) method. In the SCCA method, each station obtains a reserved transmission slot from the AP. Various scheduling algorithm can be applied to achieve an optimal system performance.

The SCCA method provides a highly efficient coordinated channel access. However, that method does provide the details of a high performance signaling method that can take advantage of the SCCA.

In the prior art random access method, resource reservation and allocation is not a concern, because there is no need to reserve channel access in advance. Each station that needs to transmit contends for the channel in a distributed manner. The IEEE 802.11e standard defines messages, such as ADDTS request, ADDTS response and DELTS, to facilitate the HCCA operation. However, the procedure and the corresponding frame format specified therein are not applicable for SCCA due to the special nature of SCCA scheme. Moreover, the signaling for HCCA mode is not efficient and considered undesirable for a high throughput network designed according to the IEEE 802.11n standard. Therefore, there is a need to provide a new signaling method, which can fulfill the signaling need of SCCA in a highly efficient fashion, offer great flexibility and extensibility while maintaining backward compatibility, and entail minimal additional implementation costs.

SUMMARY OF THE INVENTION

The invention provides a signaling method for a backoff based contention free channel access method called sequential coordinated channel access (SCCA). The method uses a minimal set of signaling messages to support the transmission of data streams during contention free periods. Moreover, the signaling method makes it possible to transmit multiple streams by the same station. The signaling method is more powerful and efficient than prior art techniques, and provides extensibility and flexibility while maintaining simplicity and backward compatibility with predefined standards.

Specifically, a method signals data in a channel of a network including multiple stations and an access point connected by a wireless channel. A station first requests access to the channel using a sequential coordinated channel access method of an access point.

After the station receives permission to access the channel during a contention free period at a time corresponding to a sequence index value received by the station from the access point, the station transmits a resource request message to the access point to obtain a bandwidth allocation.

In response, the station receives the bandwidth allocation, and the station can then transmit data during the contention free period according to the bandwidth allocation.

BRIEF DESCRIPTION OF THE DRAWINGS

FIG. 9 is a block diagram of a traffic stream information subfield.

DETAILED DESCRIPTION OF THE PREFERRED EMBODIMENT

The invention provides a signaling method for a wireless network that uses SCCA as described in U.S. patent application Ser. No. 10/888,398, "Sequential Coordinated Channel Access in Wireless Networks," filed on Jul. 9, 2004, by Yuan et al., incorporated herein by reference in its entirety.

The signaling method for the SCCA method includes the following procedures: resource reservation, resource allocation, resource renegotiation, and resource relinquishment.

Signaling Method

Figure 1:
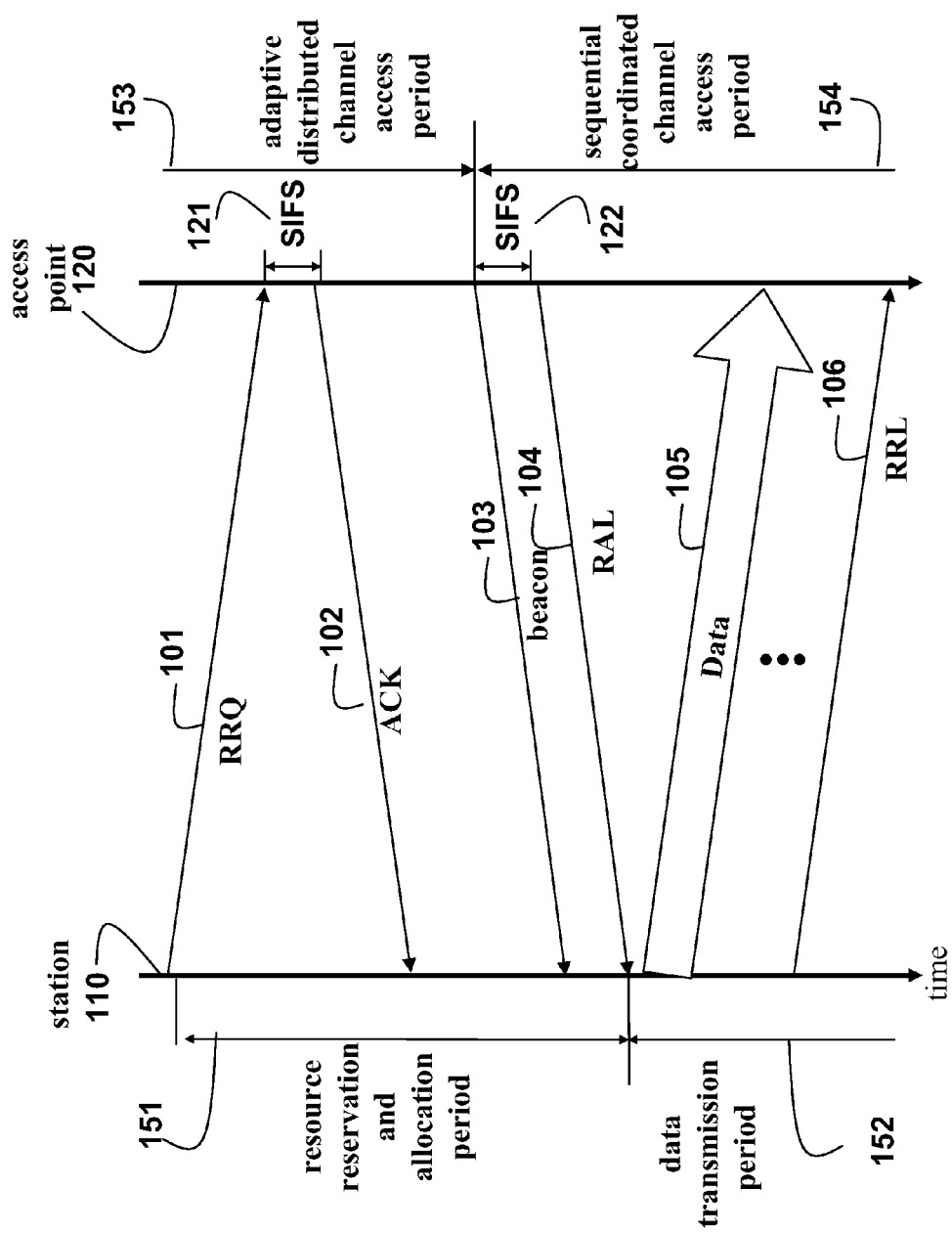
FIG. 1 is a timing diagram of a resource management method according to the invention.

As shown in FIG. 1, a resource management method 100 includes a station (STA) 110 having a resource reservation and allocation period 151, and a data transmission period 152. An access point (AP) 120 has an adaptive distributed channel access (ADCA) period 153, and a sequential coordinated channel access (SCCA) period 154. In FIG. 1, time increases from top to bottom.

Resource Reservation

To request bandwidth, the station 110 sends a resource request message (RRQ) 101 to the AP 120 during a contention period (CP). The RRQ message is treated with a highest priority by the station. Therefore, the transmission of the RRQ message and any subsequent retransmissions, if necessary, contend for channel access as a management frame or with a parameter set associated with the highest priority, e.g., AC3 parameter set according to the IEEE 802.11e EDCA standard.

In response, the AP 120 replies with an acknowledgement message (ACK) 102 after a short inter-frame space (SIFS) 121. If no ACK is received in a predetermined amount of time, then the requesting station follows the retransmission policy for the RRQ frame according to the IEEE 802.11e standard. Nevertheless, the requesting station can terminate a retransmission attempt whenever the station considers it too late to schedule traffic for a subsequent contention free period, even though the retry limit of the RRQ message has not been exceeded.

The AP sends a beacon 103 according to the IEEE 802.11 standard. It should be noted that the AP periodically sends beacons at regular intervals. After sending the beacon 103 and waiting another SIFS 122, the AP sends a resource allocation message (RAL) 104. If the station receives the RAL at the beginning of the SCCA period, then any retransmission attempts in progress are terminated. Herein, this type of retransmission mechanism is called schedule-driven retransmission.

Resource Allocation

The RAL message 104 includes allocated bandwidth information. The RAL message also includes a sequence index value (SIV) and a dynamic transmission duration period (TXDT) as described by Yuan et al. For the contention free period (CFP), these two values indicate when the station can transmit data to the AP, and for how long the transmission can last.

After receiving the RAL message 104 from the AP 120, the station starts backoff, with an initial backoff counter value set to the SIV value of the RAL message. If contention free burst (CFB) mode is supported, then the station transmits continuously data 105, with a SIFS interval between two consecutive frames, as long as an ACK policy is observed and the TXDT value is not exceeded.

Resource Renegotiation

If the station needs to modify the allocated resources, then the station can renegotiate the service agreement by sending another RRQ message to the AP. This process is called resource renegotiation. The requesting station can submit the renegotiation request at any time during either the contention period or the contention free period.

Resource Relinquishment

The station releases allocated bandwidth using a resource relinquishment (RRL) message 106, either in the contention period or in the contention free period. Upon receiving the RRL, the AP removes the station from its resource allocation table.

Signaling Messages

Figure 2:
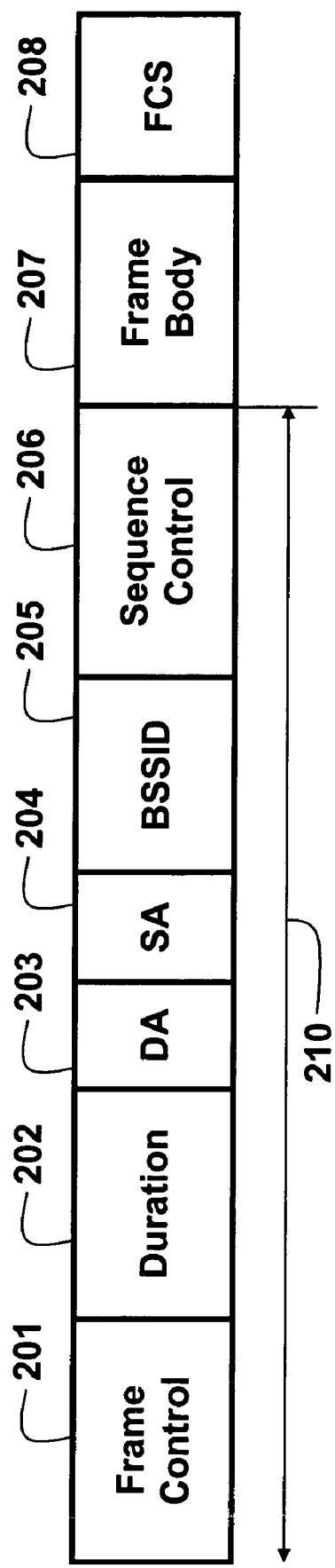
FIG. 2 is a block diagram of messages according to the invention.

FIG. 2 shows the general format 200 for the three messages RRQ 101, RAL 104, and RRL 106. Generally, the messages include fields 201-206 of a MAC header 210. A brief description of each field is provided below.

The frame control field 201 contains the relevant control information pertaining to the frame. The duration field 202 specifies the length of the current message exchange transaction and is used to update the network allocation vector (NAV). DA 203 and SA 204 are the destination MAC address and source MAC address of the frame, respectively. The BSSID 205 uniquely identifies each basic service set (BSS). The sequence control field 206 contains the sequence number of the frame being transmitted. Data payload received from the upper layer is encapsulated into the frame body field 207. Finally, frame check sequence (FCS) 208 is used to verify whether or not the received data payload is same as the one being transmitted.

Only the frame body 207 is different for the three messages. In order to ensure backward compatibility and low implementation complexity, the RRQ, RAL and RRL messages are designed to be similar to ADDTS request. ADDTS and DELTS frames are defined in the IEEE 802.11e standard, "Wireless LAN Medium Access Control (MAC) and Physical Layer (PHY) Specifications: Medium Access Control (MAC) Enhancements for Quality of Service (QoS)," Draft version 6, IEEE, November 2003.

Resource Request (RRQ)

Table 1 shows a format of the frame body 207 of the RRQ message 101. The order indicates the sequence of the fields and subfields. A category field is set to one and an action field is set to three to represent the RRQ message 101. The dialog token contained herein is copied from a received upper layer primitive, which actually causes the transmission of this frame. A list of possible action field values is provided in Table 2.

TABLE 1

RRQ Frame Format.

| Order | Information |
|---|---|
| 1 | Category |
| 2 | Action |
| 3 | Dialog Token |
| 4~n | Multi-TSPEC |

TABLE 2

QoS Action Field Values.

| Action Field Value | Meaning |
|---|---|
| 0 | ADDTS request |
| 1 | ADDTS response |
| 2 | DELTS |
| 3 | RRQ |
| 4 | RAL |
| 5 | RRL |
| 4~255 | Reserved |

Figure 3:
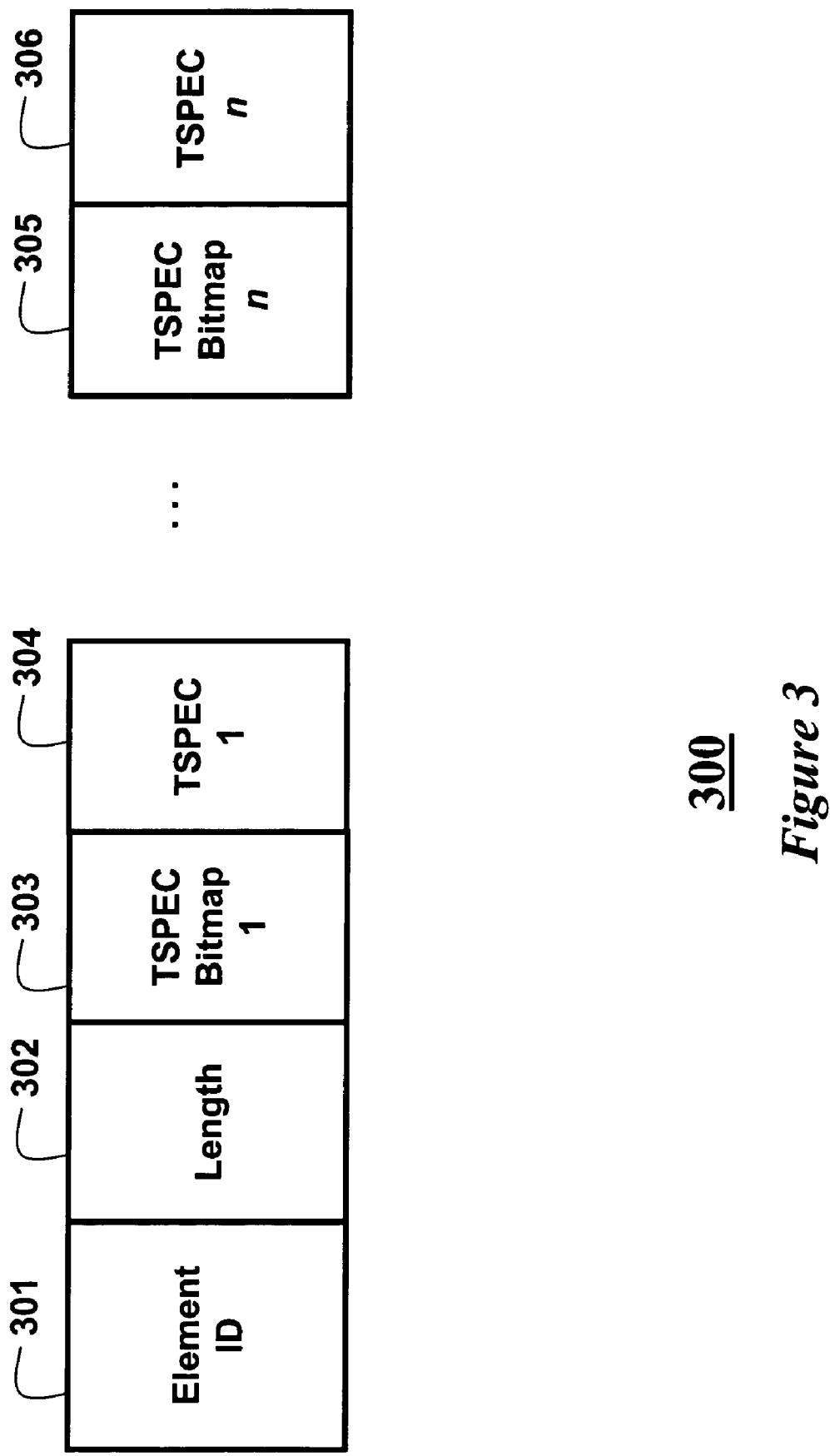
FIG. 3 is a block diagram of a multi-TSPEC field.

A format of the multi-TSPEC field 300 is shown in FIG. 3. The multi-TSPEC field can have a variable length, and contains the QoS parameters of multiple traffic streams (TSs). An element ID 301 is set to 0×26, and a length field 302 indicates a total number of individual TSPEC fields that this multi-TSPEC contains. The TSPEC Bitmap k 303 or 305, indicates the internal structure of the corresponding $k^{th}$ TSPEC 304 or 306, where k=1, 2, . . . , n.

Figure 4:
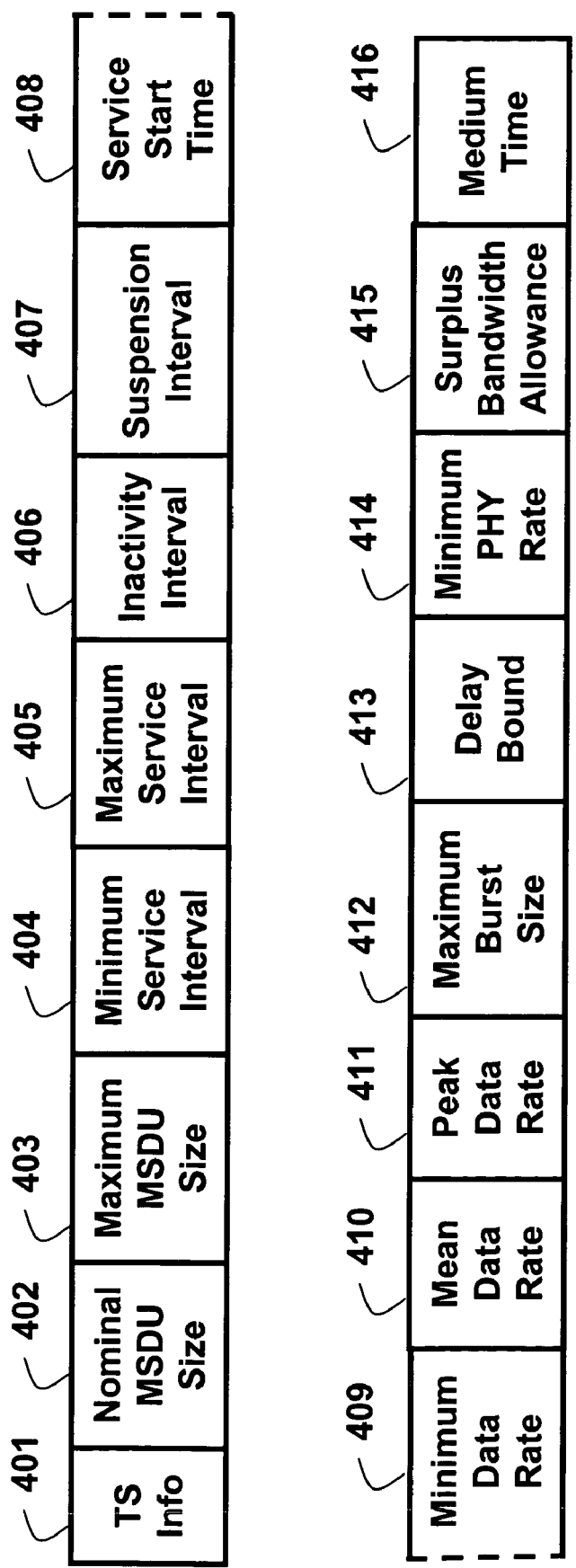
FIG. 4 is a block diagram of a complete TSPEC field.

FIG. 4 shows a complete TSPEC field 400 with subfields 401-416. Because not all subfields are used every time, the TSPEC Bitmap 303 is used to indicate used fields. A one bit in the bitmap indicates that the subfield is used. The bit is zero otherwise. The meaning of each subfield is defined is the IEEE 802.11e standard. A brief description of each field 401-416 is provided below.

TS Info field 401 contains the relevant QoS information regarding the particular traffic streams that are requesting the resource. A TS is identified by the TSID and Direction subfields contained in the TS Info field. The nominal MSDU size 402 and maximum MSDU size 403 fields specify the nominal size and maximum size, respectively, of the MSDUs belonging to the traffic stream (TS) under this traffic specification. The minimum 404 and maximum 405 service interval fields define the minimum and maximum interval between the start of two successive SCCA service periods. The inactivity interval field 406 specifies the maximum amount of time that may elapse without arrival or transfer of an MSDU belonging to the traffic stream (TS) before this TS is deleted by the MAC entity at the AP. The suspension interval field 407 is kept for backward compatibility purposes and is reserved for future extension for SCCA signaling. The service start time 408 informs the AP at what time the requesting station desires to start the transmission. The minimum data rate 409, mean data rate 410 and peak data rate 411 specify the lowest, average and peak data rates, respectively, specified at the MAC SAP. The maximum burst size field 412 specifies the maximum burst size of the MSDUs belonging to this TS that arrive at the MAC SAP at the peak data rate. The delay bound field 413 specifies the maximum amount of time allowed to transport an MSDU belonging to the TS in this TSPEC. The minimum PHY rate field 414 specifies the desired minimum PHY rate to use for this TS that is required for transport of the MSDUs belonging to the TS in this TSPEC. The surplus bandwidth allowance factor field 415 specifies the excess allocation of time and bandwidth over and above the stated application rates required to transport an MSDU belonging to the TS in this TSPEC. The medium time field 416 contains the amount of time admitted to access the medium.

Note that the same RRQ message is used in both resource request and the resource renegotiation processes. The AP interprets the received RRQ message as either a resource request or a resource renegotiation.

Resource Allocation (RAL)

A format of the frame body 500 for the RAL message 104 is shown in Table 3. The category field is set to one and the action field is set to four to represent a RAL message. The dialog token is copied from the dialog token field contained in the received upper layer primitive that causes the frame to be sent. A list of all used action field value is provided in Table 2.

TABLE 3

RAL Frame Format.

| Order | Information |
| --- | --- |
| 1 | Category |
| 2 | Action |
| 3 | Dialog Token |
| 4~n | Multi-Schedule |

Figure 5:
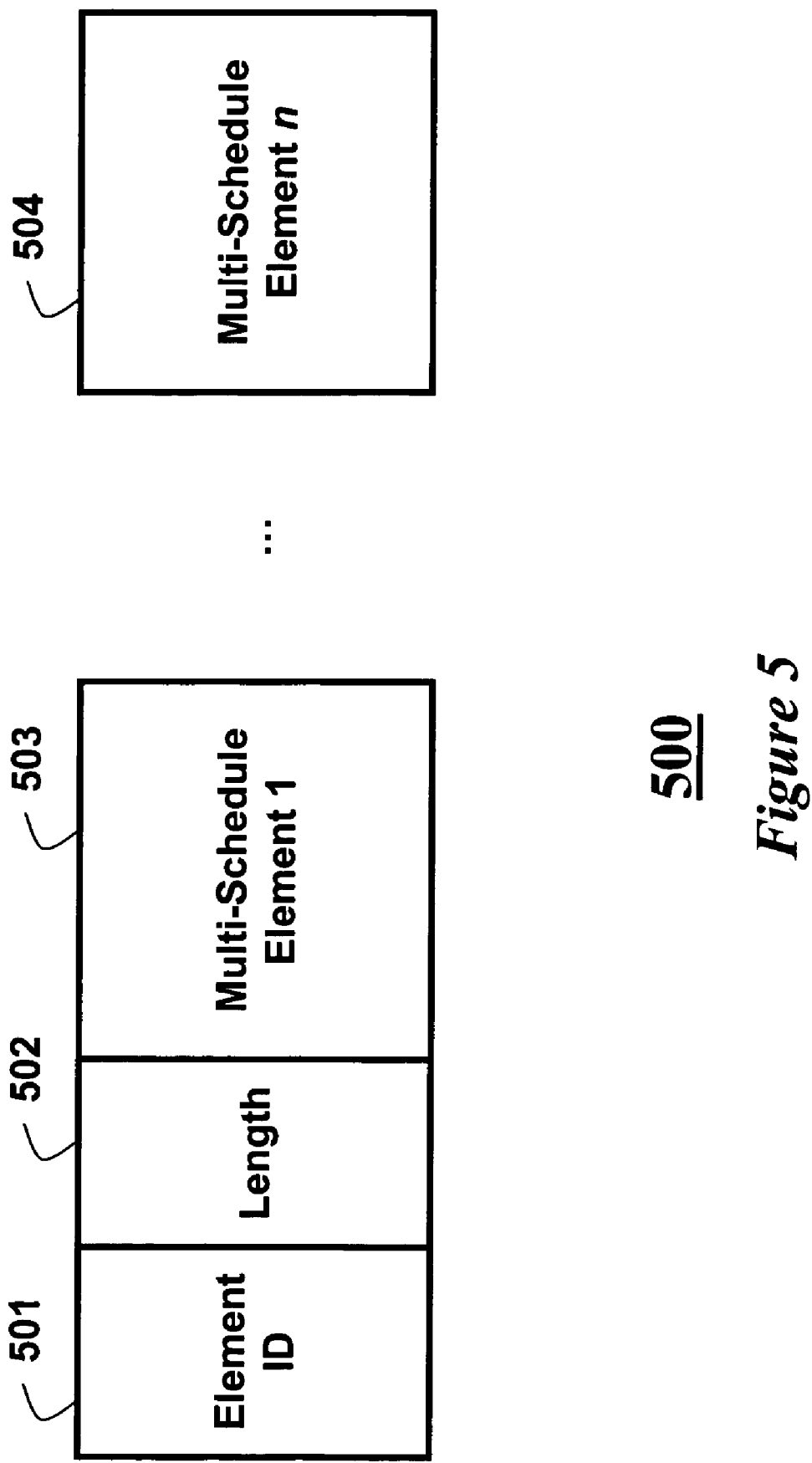
FIG. 5 is a block diagram of a multi-schedule field.

The format 500 of the Multi-Schedule field is shown in FIG. 5 with an element ID field 501 and a length field 502 representing one or more following Multi-Schedule elements 503-504.

Figure 6:
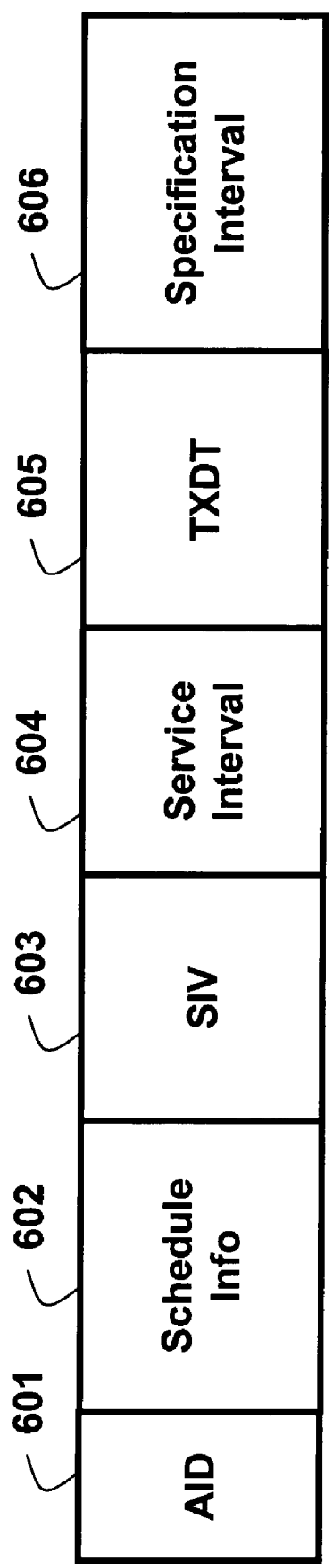
FIG. 6 is a block diagram of a multi-schedule element subfield.

A structure 600 of the Multi-Schedule element is shown in FIG. 6. A sequence index value (SIV) 603 component is the initial backoff counter value assigned to the station. This value essentially determines the sequence in which each station accesses the channel. An association ID (AID) field 601 contains the AID of the station to which this reservation allocation belongs. The service interval field 604 indicates the time between two successive service periods. The TXDT field 605 specifies how long the channel is allocated to the requesting traffic stream. The specification interval 606 specifies the time interval in units of TUs (1024 μs) to verify schedule conformance.

Figure 7:
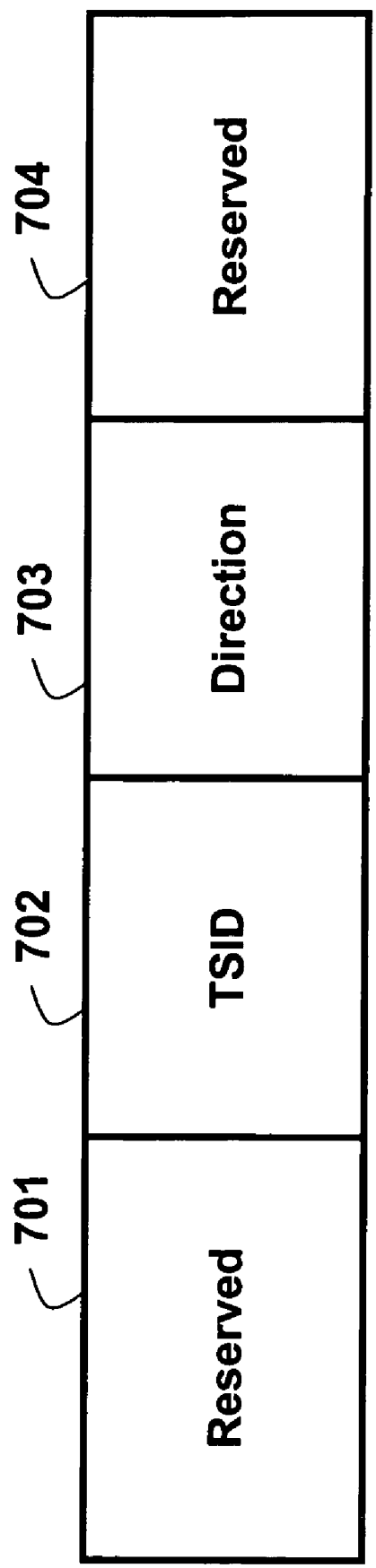
FIG. 7 is a block diagram of a schedule info subfield.

A structure 700 of the Schedule Info subfield 602 is shown in FIG. 7, and is identical to that defined by IEEE 802.11e. The first bit B0 701 and bits B7 through B15 704 are reserved for future extensions. The direction field 703 tells whether the traffic stream is from the access point (AP) to station or vice versa. The second field, TSID 702, along with the AID 601, and the direction field 703 in the Schedule Info subfield 602, can uniquely identify a flow. All other fields and subfields are defined according to the IEEE 802.11e standard.

Resource Relinquishment (RRL)

The format of the frame body of the RRL message 106 is shown in Table 4.

TABLE 4

RRL Frame Format.

| Order | Information |
| --- | --- |
| 1 | Category |
| 2 | Action |
| 3~n | RRL element |

Figure 8:
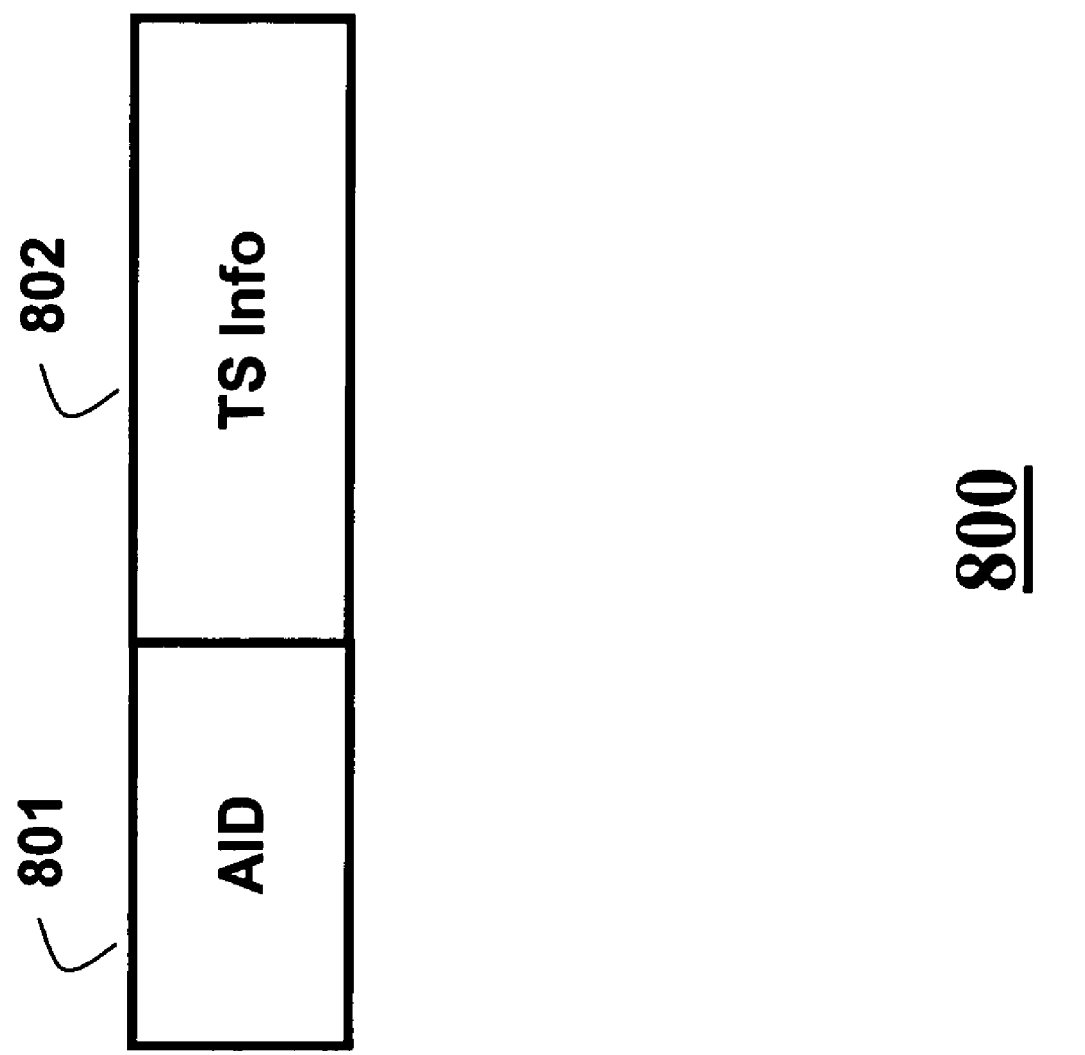
FIG. 8 is a block diagram of a resource relinquish message.

The RRL message has a category value of one, and an action value of five. The frame body 800 of the RRL message has multiple RRL element subfields as shown in FIG. 8 with fields 801-802. Each tuplet of AID 801 and TS Info 802 corresponds to a traffic stream that is to be deallocated or released by the AP. The AID 801, along with the TSID 902 and direction 903 in the TS Info 802 field can uniquely identify the stream to be terminated.

The format 900 of the TS Info subfield 801 is shown in FIG. 9. The detailed meanings of the subfields 901-910 are defined in IEEE 802.11e standard. The traffic type subfield 901 is set to one when the stream has a periodic traffic pattern, e.g., an isochronous traffic stream of MSDUs with constant or variable sizes that are originated at fixed rate. The field is set to zero for an aperiodic, or unspecified traffic patterns, e.g., an asynchronous traffic stream of low-duty cycles. The access policy subfield 904 specifies the access that would be used for the traffic stream. The aggregation subfield 905 is kept for backward compatibility purposes and can be used for future extension. The APSD subfield 906 is set to one to indicate that automatic power save delivery is to be used for the traffic associated with the TSPEC. The user priority subfield 907 indicates the actual value of the UP to be used for the transport of MSDUs belonging to this traffic stream in cases where relative prioritization is required. The TS Info ACK Policy 908 subfield indicates whether MAC acknowledgements are required for MSDUs belonging to this TID, and the desired form of those acknowledgements. The schedule subfield 909 specifies the requested type of schedule. The subfield 910 is reserved for future extensions.

Backward Compatibility

Stations that do not use the signaling as described herein can ignore the resource allocation (RAL) message and remain silent during the SCCA period 154, as long as the AP sets the NAV for all of the stations. The RRQ and RRL messages do not interfere with other stations. Therefore, the signaling according to the invention is backward compatible with networks designed according to the IEEE 802.11 standard.

Implementation Issues

The three messages, RRQ, RRL and RAL, are mutually exclusive in terms of their intended functionality and altogether provide all signaling needs of the SCCA method as described by Yuan et al. Because the signaling according to the invention uses a minimal message set to support SCCA operation, the complexity of the implementation is minimized.

Moreover, all three signaling messages have a similar format to that of ADDTS request, ADDTS response, and DELTS messages in according to the IEEE 802.11e standard.

EFFECT OF THE INVENTION

The invention provides a signaling method for a SCCA method. The method uses three signaling messages to handle resource reservation, resource allocation, resource renegotiation and resource relinquishment. The signaling is efficient, and provides extensibility and flexibility, while maintaining simplicity and backward compatibility.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for signaling in a channel of a network including a plurality of stations and an access point connected by a wireless channel, comprising:

requesting, by a station, access to a channel using a sequential coordinated channel access method of an access point;

receiving, in the station, permission to access the channel during a contention free period at a time corresponding to a sequence index value received by the station from the access point;

transmitting, by the station, a resource request message to the access point to obtain a bandwidth allocation from the access point;

receiving from the access point a resource allocation message including the bandwidth allocation; and transmitting data during the contention free period according to the bandwidth allocation.

2. The method of claim 1, further comprising:

transmitting a resource renegotiation message to the access point to modify the bandwidth allocation;

receiving from the access point a new resource allocation message including a modified bandwidth allocation; and transmitting data during the contention free period according to the modified bandwidth allocation.

3. The method of claim 2, in which the renegotiation message is transmitted during the contention free period.

4. The method of claim 2, in which the renegotiation message is transmitted during a contention period.

5. The method of claim 1, further comprising:

transmitting a resource relinquishment message to the access point to terminate the bandwidth allocation.

6. The method of claim 5, in which the resource relinquishment message is transmitted during a contention free period.

7. The method of claim 5, in which the resource relinquishment message is transmitted during a contention period.

8. The method of claim 1, in which the resource request message is for data to be transmitted as a single traffic stream.

9. The method of claim 1, in which the resource request message is for data to be transmitted as a plurality of traffic streams.

10. The method of claim 1, further comprising:

indicating a length of time that the station can transmit during the contention free period in the resource allocation message.

11. The method of claim 1, further comprising:

allocating the bandwidth to data of a single traffic stream.

12. The method of claim 1, further comprising:

allocating the bandwidth to data of a plurality of traffic streams.

13. The method of claim 1, further comprising:

specifying a minimum data rate, a mean data rate, and a peak data rate for the data in a traffic specification of the resource request message.

14. The method of claim 13, further comprising:

specifying a direction of transmitting the data in the traffic specification.

* * * * *